United States Patent [19]

Ozer et al.

[11] 4,338,050
[45] Jul. 6, 1982

[54] METHOD AND TOOL FOR GENERATING HOLES IN COMPOSITE MATERIALS

[75] Inventors: Theodore Ozer; Alexander Yankovoy, both of Wallingford; James Imbessi, Morton, all of Pa.

[73] Assignee: The Boeing Company, Seattle, Wash.

[21] Appl. No.: 166,868

[22] Filed: Jul. 7, 1980

[51] Int. Cl.³ ............................................. B23B 51/00
[52] U.S. Cl. .................................. 408/1 R; 408/211; 407/53
[58] Field of Search ................... 408/1, 211, 212, 213, 408/223; 407/34, 42, 53, 54

[56] References Cited

U.S. PATENT DOCUMENTS

| | | | |
|---|---|---|---|
| 1,789,793 | 1/1931 | Wedhorn | 407/54 |
| 1,907,880 | 5/1933 | Royle | 407/54 |
| 2,718,689 | 9/1955 | Mason et al. | 407/54 |
| 3,014,386 | 12/1961 | Kallio . | |
| 3,120,766 | 2/1964 | Zagar . | |
| 3,227,013 | 1/1966 | Zimmerman . | |
| 3,260,139 | 7/1966 | Sanborn . | |
| 4,145,159 | 3/1979 | Yamada et al. | 407/53 |

OTHER PUBLICATIONS

"A Guide to Cutting and Machining Kevlar Aramid"; E. I. Du Pont, Wilmington, Del.

*Primary Examiner*—Leonidas Vlachos
*Attorney, Agent, or Firm*—Felix J. D'Ambrosio; Jack D. Puffer; Thomas E. McDonald

[57] ABSTRACT

A method and tool for drilling holes in a composite of materials having different strength and elastic characteristics. The tool has a planar end surface inclined in two directions relative to the tool axes, and an axially-extending flute which define, with the periphery of the tool, a cutting single end point and adjacent cutting edges which are guided within the hole being formed by three axially-extending wearstrip segments of the tool periphery. The radius of the tool is gradually reduced from the final wearstrip to the side of the flute opposite the cutting single end point. The cutting end portion of the tool may be formed of a very hard carbide material. The method provides for simultaneous point and surface cutting of the composite. Point and surface cutting occur at the outer circumferential surface of the hole generally along a radius of the hole to be drilled. Cutting also occurs along a radius of the hole being generated.

17 Claims, 14 Drawing Figures

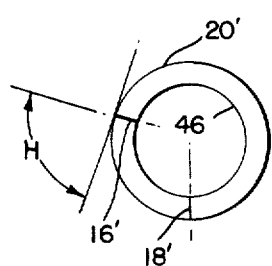
FIG.10
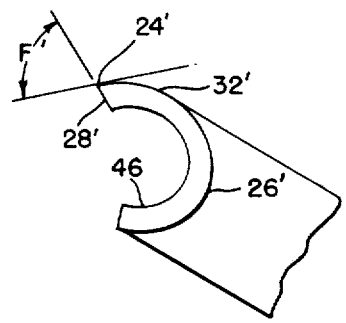
FIG.11
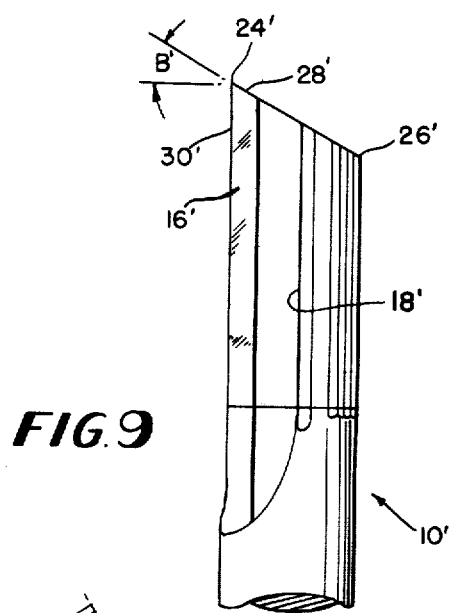
FIG.9
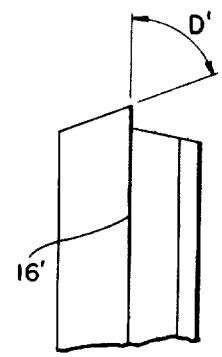
FIG.12
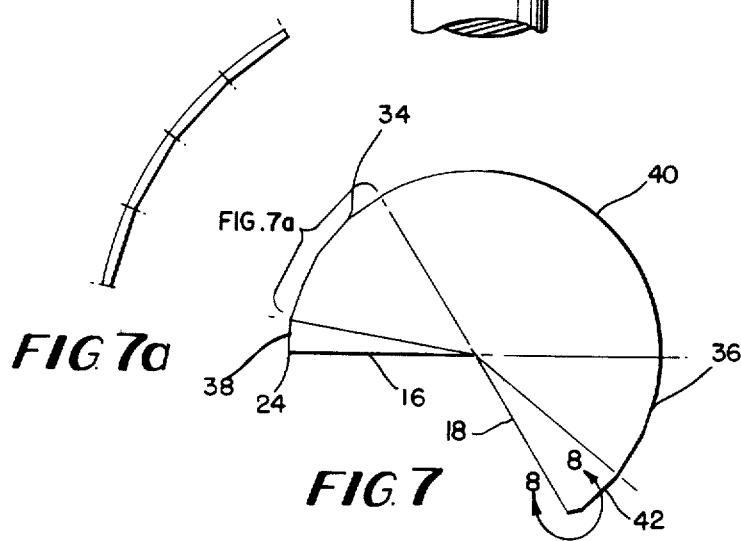
FIG.7a
FIG.7
FIG.8

METHOD AND TOOL FOR GENERATING HOLES IN COMPOSITE MATERIALS

BACKGROUND OF THE INVENTION

This invention relates in general to generating holes in composites, and in particular, to generating holes in composites with a rotary cutting tool, the composites comprising at least two materials having different moduli of elasticity.

In the past, it has been difficult to quickly and accurately drill holes in composite material, such as for example, aramid fiber/epoxy or other resin bonded laminates. Experience has shown that the aramid fibers, which have a smaller diameter and a higher tensile strength, elasticity, and shear resistance than the more conventional glass fibers used in similar composite compositions, tend to deflect and bend before being cut by the shearing action of the cutting edge of the drill. This action forces the fibers into the softer resilient resin matrix material, increasing radial compressive forces on the drill and the surrounding composite material. These compressive forces generate frictional heat which further softens the resin matrix, allowing the rough aramid fiber to further escape the shearing action of conventional drills. The heat generated also limits the drill speed and feed pressure so that the material surrounding the drilled hole is not damaged by excessive heating. Also, as a result of this characteristic of aramid fiber reinforced resin laminates, holes drilled by conventional means are often undersized holes with frayed or fuzzy edges, and mushrooming of the aramid fibers at the tool exit.

It is known to drill holes in aramid fibers/epoxy laminates using a special self-centering serrated drill. This drill includes clockwise spiraled serrations which extend backwardly and inwardly from the pointed drill end to a reduced diameter portion of the drill, and counterclockwise spiral serrations which extend backwardly and outwardly from this reduced diameter portion of the drill. In order to prevent an excessive heating of the composite when this serrated drill is used to generate holes in aramid fibers/epoxy composites, a low drilling speed must be used. Also, to obtain clean exit and entrance surfaces, this serrated drill must fully penetrate the laminate, that is, the entire serrated area must pass totally through the composite. After this initial penetration, the drill must be moved rapidly back and forth in its axial direction, again using the entire threaded, or "hour-glass" portion of the drill to clean the remaining uncut fibers from the laminate.

OBJECTS AND SUMMARY OF THE INVENTION

Hence, it is an object of the invention to provide an optimized method and tool for generating accurate holes with clean hole edges in composites of at least two materials, in which one material has a higher modulus of elasticity than the other material.

It is a further object of the invention to provide an optimized method and tool for generating holes in composites according to which less heat is generated during the cutting operation than prior known methods and tools, to thus allow higher cutting speeds and the use of cutting edges formed of very hard material, such as various carbides.

It is still another object of the invention to provide an optimized method and tool for easily and quickly generating deep holes with clean hole edges in composites of materials with different moduli of elasticity.

Still another object of the invention is to provide an optimized tool for generating holes in composites of the type described above which is relatively easy and inexpensive to manufacture.

The method provides for simultaneous point and surface cutting. Point and surface cutting occur at the outer circumferential surface of the hole and generally along a radius of the hole to be drilled. At the outer circumferential surface, the point cutting proceeds normal to the planar area of the hole, while the surface cutting proceeds circumferentially.

The tool, which is generally shaped as a cylindrical rod, has an axially extending flute and an end surface which is inclined in two directions. The intersection of the end surface with one side surface of the flute, the intersection of the end surface with the semi-cylindrical outer surface of the rod, and the intersection of the noted end surface of the flute and the semi-cylindrical outer surface of the rod define a cutting single end point and associated cutting edges. The geometry of the cutting single end point, hereinafter referred to as the single end point, and its associated cutting edges is optimized such that the cutting forces are generated during a hole forming operation so as to produce a unique shearing action on the outermost fibers of the portion of the composite to be removed, thereby producing a clean cut edge.

Preferably, the geometry of the single end point and its associated cutting edges is such that the end surface intersects the one side of the flute adjacent the end point at an acute angle to form one of the cutting edges, a first cutting edge. This same side of the flute intersects the outer surface adjacent the end point at an acute angle to form another cutting edge, a second cutting edge. The second cutting edge intersects the first cutting edge at an acute angle at the single end point. The end surface also intersects the semi-cylindrical outer surface to form a third edge, which intersects the first and second cutting edges at the single end point. Accordingly, two adjacent ends of a single surface of the flute form cutting edges which intersect each other and a third edge at a common point, with the included angles defined by the respective edges being acute, and with the common point forming a cutting point.

During a hole forming operation, the single end point first cuts the composite and thereby penetrates successive transverse planes of the composite, i.e., transverse to the longitudinal axis of the hole to be generated, and the portions of the cutting edges immediately adjacent the single end point cleanly cuts the fibers of the composite at each successively cut transverse plane in the immediate region of the penetration. Penetration is facilitated by the two cutting edges and the third edge adjacent the single end point. The first cutting edge also cuts away chips from the cylindrical composite portion to be removed to form the hole progressively inward, and directs these chips away from the side of the hole and longitudinally through the passage formed by the flute and the side of the hole, which has a relatively large cross-sectional area, typically one-third of the hole cross-sectional area, for rapid and efficient chip removal.

By penetrating the composite and severing the fibers in the immediate region of the penetration, as noted above, very little deflection of these fibers occurs; thus, the radial compressive forces exerted on the tool by these fibers and the thrust requirements of the tool are reduced to a minimum, and an accurately sized, clean cut hole is produced. Also, since frictional heating of the tool and the composite is likewise reduced, due primarily to the geometry of the single end point, higher cutting speeds can be used, to allow the use of carbide tooling which normally requires a minimal cutting speed for high performance.

Portions of the circular outer periphery of the tool are ground to form three parallel axially-extending wearstrips similar to those of a gun-type drill, which guide the tool and allow the tool to be used for generating very deep holes.

Since aramid fiber/epoxy composites tend to expand radially in all directions, while being drilled and to contract slightly as the drill tool is removed, the portion of the circular outer periphery of the tool adjacent the opposite side of the flute is flattened to provide a gradual transition of radial compressive stresses as the final wearstrip rotates in the hole.

In the preferred embodiments of the invention, the end surface of the tool is a planar surface, the flute is a V-shaped flute defined by two intersecting planar side surfaces of the flute, and the entire cutting end of the tool is formed of a very hard carbide material, to thus provide an efficient, high speed tool which is relatively easy and inexpensive to manufacture for drilling holes in composites, such as an aramid fiber and epoxy combination.

The above and other objects and features of the invention will become more readily apparent from the following description of preferred embodiments of the invention.

BRIEF DESCRIPTION OF THE DRAWINGS

FIG. 7 is an enlarged simplified top view of the embodiment shown in FIG. 1;

FIG. 7a is an enlarged view of a portion of FIG. 7;

FIG. 8 is an enlarged view of the portion of FIG. 7 encircled by the line 7—7 of FIG. 7;

FIG. 9 is a front elevational view of the cutting end portion of another embodiment of the tool of the invention, viewed with one side surface of the flute of the tool in the plane of the paper;

FIG. 10 is a top view of the embodiment of FIG. 9;

FIG. 11 is a view of the cutting end portion of the embodiment shown in FIG. 9, viewed along the line 11—11 of FIG. 9;

FIG. 12 is a view of the top portion of the embodiment shown in FIG. 10, with the other side surface of the flute of the tool in the plane of the paper.

DETAILED DESCRIPTION

TOOL

Two preferred embodiments of the tool will be discussed.

Figures 2, 6:
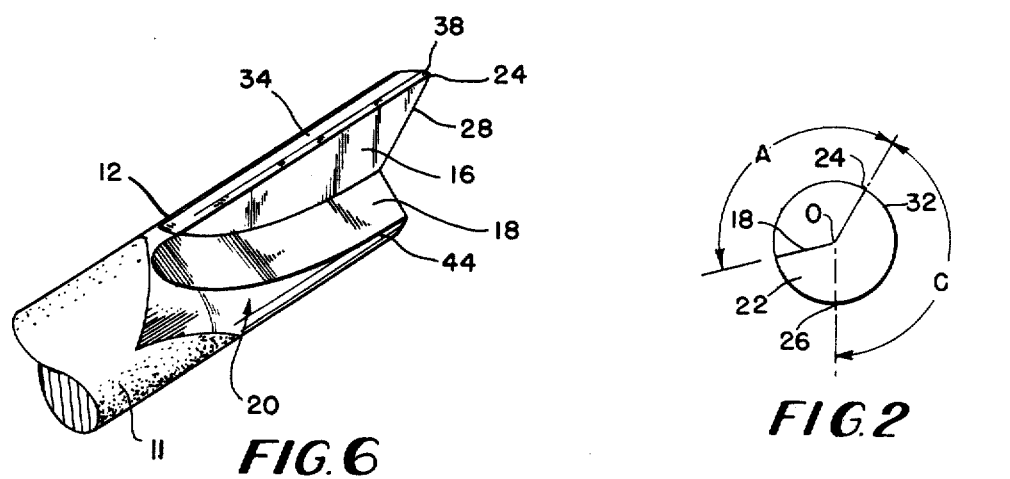
FIG. 2 is a top view of the embodiment of FIG. 1. In this view, the tool has been rotated clockwise from the position shown in FIG. 1.
FIG. 6 is a perspective view of the cutting end of the embodiment shown in FIG. 1.

Referring to FIGS. 1-8, a hole drilling tool 10 includes a shank end portion 11 and a cutting end portion or insert 12 of hard material, such as tungsten carbide or titanium carbide, joined in a conventional manner. The tool 10 includes a longitudinally extending V-shaped flute or groove 14, which is defined by two planar side surfaces 16, 18. The planar side surfaces 16, 18 intersect such that a portion of the intersection coincides with the axis O—O of the tool 10 at an obtuse angle A, as seen in FIG. 2, and extend radially outward from the intersection to a generally semi-cylindrical outer surface 20 of the tool 10. The side surface 18 tapers in the manner shown most clearly in FIGS. 1 and 3. The side surface 16 preferably does not taper.

Figures 1, 3, 4:
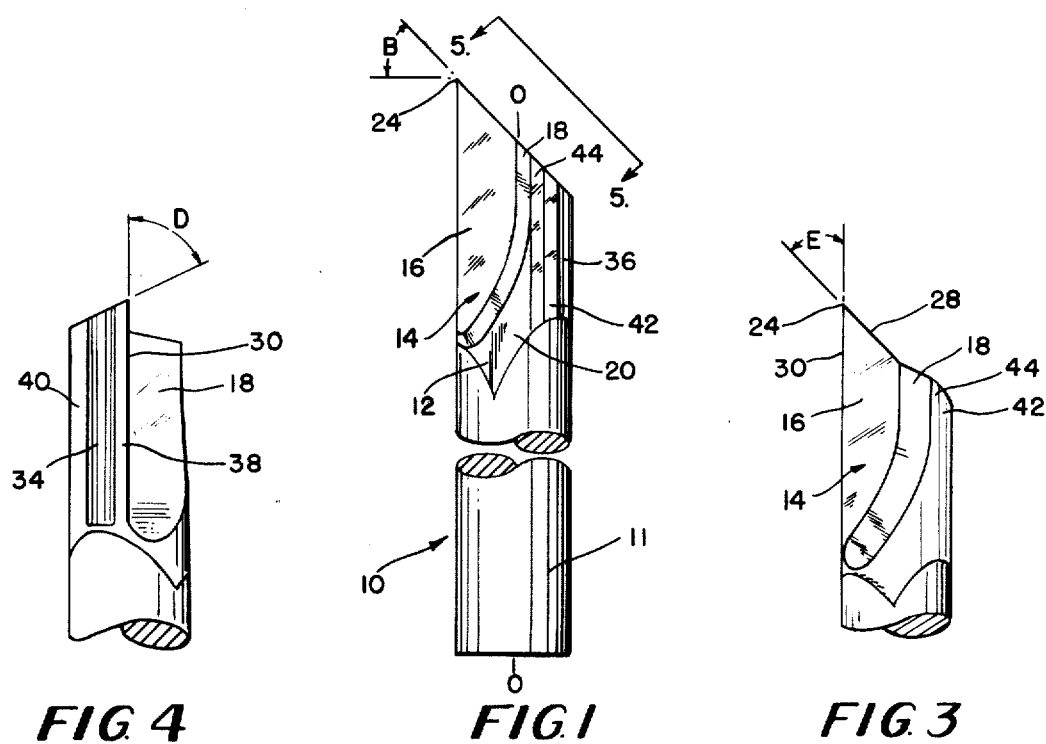
FIG. 1 is a front elevational view of a tool for generating holes, according to the invention, viewed with one side of the flute surface of the tool in the plane of the paper.
FIG. 3 is an elevational view of the cutting end portion of the embodiment shown in FIG. 1 rotated approximately 30° from the position of FIG. 1.
FIG. 4 is an elevational view of the cutting end portion of the embodiment shown in FIG. 1 rotated approximately 90° from the position of FIG. 1.
Figures 5, 13:
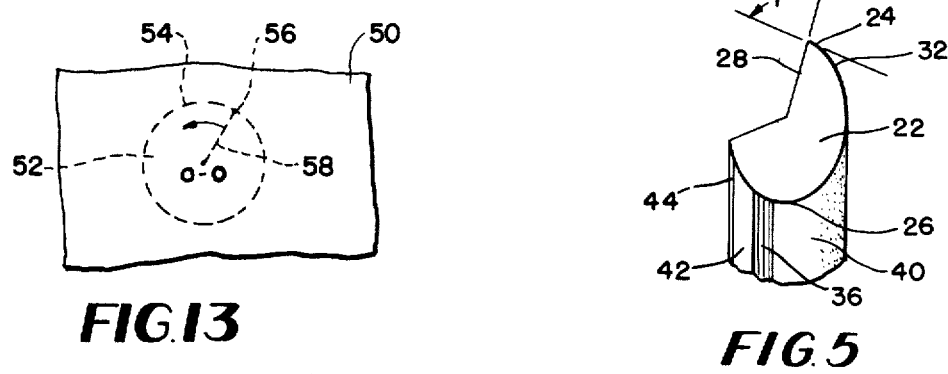
FIG. 5 is a view of the cutting end portion of the embodiment shown in FIG. 1, viewed along the line 5—5 of FIG. 1 and with the rotation of FIG. 2.
FIG. 13 is a schematic view of a composite in which a hole is to be generated in accordance with the invention.

The tool 10 has a planar end surface 22 whose shape is defined by the peripheral surfaces 16, 18, 20 of the tool. The planar end surface 22 defines an angle of inclination B to a horizontal plane orthagonal to the axis O—O of the tool 10, as shown in FIG. 1. The planar end surface 22 is inclined at the angle B to the horizontal plane so that it is shaped as an elipse having one portion defined by the side surfaces 16, 18, removed to form the flute 14, as best seen in FIG. 5.

The planar end surface 22 is disposed relative to the flute 14 so that the flute side surface 16, the outer surface 20, and the planar end surface 22 intersect at a common single end point 24 which, when the tool 10 is rotated in a counter-clockwise direction as seen in FIG. 2, leads the lowest point 26 of the planar end surface 22 by an obtuse angle C less than 180°.

The planar end surface 22 intersects the leading flute side surface 16 adjacent the single end point 24 at an acute angle D, as shown in FIG. 4, to form a first cutting edge 28. The flute side surface 16 intersects the outer surface 20 at a 90° angle, as shown in FIG. 2, to form a second cutting edge 30, which intersects the first cutting edge 28 at an acute angle E at the single end point 24, as shown in FIG. 3. Also, the planar end surface 22 intersects the outer surface 20 to form a third edge 32 which is curved and extends from the single end point 24 and intersects the first cutting edge 28 at an acute angle F, as shown in FIG. 5.

Two axially-extending segments 34, 35 of the outer semi-cylindrical surface 20 are slightly recessed from the surface 20 to provide radial clearance at these portions, typically in the order of 0.003 inches, and to define three spaced-apart wearstrips 38, 40, 42, extending the length of the cutting portion 12 of the tool 10, which serve as axial guides for the tool 10 when it is used for drilling deep holes. These radial relief segments 34, 36 may be formed by grinding axially-extending flat portions, as shown in FIG. 7a, or alternately may be cam ground to provide radial relief segments 34, 36 of semi-cylindrical shape. A first or leading wearstrip 38 of the outer surface 20 which intersects the leading flute side surface 16 to form the second cutting edge 30, typically has a minimum width of 0.02 inches, and the final wearstrip 42 typically extends over approximately 5° of the outer surface 20.

Also, radial clearance is provided by a transition segment 44, of the outer surface 20 adjacent the flute side surface 18, to provide a gradual transition of radial compressive stresses as the final wearstrip 42 rotates within the hole formed in the composite material. This segment 44 is typically formed as a flat portion extending over approximately 5° of the outer surface 20 to provide approximately 0.003 inches clearance at the intersection of the flute side surface 18 and the wearstrip 42, as shown in FIG. 9.

In the embodiment of FIGS. 1-8, the angle A, at which the two flute side surfaces 16, 18 intersect, is approximately 120°. Thus, the three wearstrips 38, 40, 42, extend over approximately 235° of the outer surface 20. It is desirable that the cross-sectional area of the passage formed by the flute side surfaces 16, 18 and the side of the hole being drilled, which is proportional to the angle A, be relatively large to effect rapid and efficient removal of the composite chips during the hole forming operation. However, it is equally desirable that the three wearstrips 38, 40, 42, extend over a large portion of the outer surface 20 to effectively guide the tool 10. Both of these desired conditions are obtained by forming the flute side surfaces 16, 18 to intersect the angle A in the range of 110° to 130°.

The angle C, on the other hand, is made as large as possible, but less than 180° in order to provide a rotational clearance for the cutting edge 28. A preferred range for the angle C is 150° to 165°.

Of particular importance is the region of the tool at which the single end point 24 is defined. In this region, it is preferred to have three edges 28, 30, 32 intersecting at the single end point with the single end point serving as a cutting point with two of these edges 28, 30 serving as cutting edges and with the included angles, D, E and F being acute.

The optimum range of values for the angles E and D (angle F is set, for the most part, by a determination of angles E and D) will depend on such factors as the type of composite material being drilled, the material of the tool 10, the diameter and depth of the hole, and the drilling speed. While the optimum range of values for the angles E and D depends on the factors noted, the minimum value for these angles is largely determined by the characteristics of the tool 10. For example, breakage and wear at the single end point and heat conduction away from the single end point are factors to consider. Likewise, the maximum value for these angles is largely determined by the characteristics of the composite. For example, undersizing, fraying and mushrooming are factors to consider. As these angles are decreased, the single end point 24 will be more quickly worn down and more likely to break, and less heat will be conducted away from the single end point 24 through the tool 10. As these angles are increased, undersizing, fraying and mushrooming are more apt to appear. Also, all three of the wearstrips 38, 40, 42 will not enter the hole to serve as axial guides therein until the hole being formed is relatively deep.

Taking the above into consideration, the minimum angle E of the tool 10 for drilling relatively deep holes in a composite, i.e., holes where all three wearstrips enter the hole and serve a guide function, with a minimum risk of breakage, an acceptable amount of wear and an acceptable degree of heat transfer is preferably at least 20°. The corresponding minimum angle D is preferably at least 15°. The maximum angle E, from the standpoint of hole quality is preferably no more than 65°. The corresponding maximum angle D is preferably no more than 25°. Beyond these limits, the results obtained as to the tool and hole quality have been found to be unsatisfactory.

To demonstrate the effect of varying just the angle E of the tool 10 on the quality of the hole formed by the tool 10, holes were drilled at 900 rpm in a specimen of approximately 0.100 inch thick, laminated Kevlar-/epoxy composite by three ⅜ inch diameter tools 10 having angles E of 45°, 65°, and 80°, respectively, and an angle D, in each case, of 15°, 20°, and 25°. The exit side of each specimen was magnified approximately six times and visually inspected.

The tool 10 having an angle E of 45° formed a hole of excellent quality, with virtually no fuzzing or delamination. The tool 10 having an angle E of 65° formed a hole which also appeared to be of excellent quality, when viewed by the naked eye. However, when viewed under a magnifier, some fuzzing around the edge of the hole, as well as delamination extending approximately 0.015 inch beyond the edge of the hole, was evident. The tool 10 having an angle E of 80° formed a hole of lesser quality than the holes noted above in which fuzzing around the edge of the hole was observable to the naked eye. Also, delamination extended approximately 0.04 inch beyond the edge of the hole.

Since the embodiment of the invention shown in FIGS. 9-12 is very similar to the embodiment described above and shown in FIGS. 1-8, the same identifying numbers and letters have been used to identify elements of the embodiment of FIGS. 9-12 which are identical or serve the same function as corresponding elements of the embodiment of FIGS. 1-8, and are not discussed in detail herein. Thus, FIGS. 9-12 show a tool 10' for generating holes in composites of at least two materials having different moduli of elasticity, which has a single end point 24', three wearstrips 38', 40', and 42', and a transition segment 44' for producing accurate holes with clean sides and edges.

However, in the embodiment of FIGS. 9-12, the two flute side surfaces 16', 18' extend radially inward from the outer surface 20' to a semi-cylindrical inner surface 46, which defines an axially-extending center bore of the tool 10' for receiving an uncut "core" portion of the composite when the tool 10' is used to generate a hole by the trepanning method. This embodiment of the invention can be used to quickly and accurately generate extremely large diameter holes in composites of the type described herein.

Also, in this embodiment, the flute side surface 16' intersects the outer semi-cylindrical surface 20' at an acute angle H, as shown in FIG. 10, rather than at a right angle as in the case of the embodiment of FIG. 1. However, the flute side surface 16' must still intersect the planar end surface 22' at an acute angle D', as shown in FIG. 12.

There are many other modifications and changes which can be made to the preferred embodiment of the invention shown in FIG. 1 in addition to the two additional features of the embodiment of FIG. 9. For example, neither the cutting end surface, nor the surfaces defining the flute 14 are required to be planar surfaces, so long as the end surface intersects the leading flute side adjacent the single end point at an acute angle to form a first cutting edge, the leading flute side intersects the outer semi-cylindrical surface adjacent the single end point at an acute angle as well to form a second cutting edge, which intersects the first cutting edge at an acute angle adjacent the single end point, and the end surface intersects the outer surface to form a third edge which intersects the first and second cutting edges at respective acute angles. Also, the flute 14 must extend radially inward to at least the axis of the tool. In the embodiment of FIGS. 9-12, the flute 14' actually extends beyond the axis of the tool because of the space defined by the inner surface 46.

Similarly, the transition segment 44' of the outer surface 20 can be a curved surface, rather than a flat surface, so long as it provides a gradual transition of radial compressive stresses in the composite during the rotation of the tool during a hole forming operation.

The tool described herein can be used to generate holes in a wide variety of composites having one material which has significantly higher elasticity and/or tensile strength than other materials in the composite. For example, this tool can be used to quickly and accurately drill high quality holes in a honeycomb structure of paper or other fiberous material impregnated with an epoxy resin and having a thin outer layer or skin of metal such as aluminum.

METHOD

Referring to FIG. 13, a composite 50 is schematically illustrated in which a hole 52 is to be drilled. The hole 52 is to have a circumferential surface 54 and a central axis O—O (which coincides with the axis O—O of the tool 10). When the tool 10 is used to generate the hole 52, it is rotated about its axis O—O in a counter-clockwise direction, as seen in FIG. 2, and moved in an axial direction to engage the cutting single end point 24 with the composite at point 56 on the circumferential surface 54. The tool 10 is guided within a conventional hardened guide bushing (not shown), which is well known to the art. The sharp cutting single end point 24 at the intersection of the first and second cutting edges 28, 30 first engages the composite to cleanly cut the outermost fibers at the point 56 and commence successive penetration of parallel transverse planes of the composite in the direction of the axis O—O and about the circumferential surface 54. As the single end point 24 cuts and penetrates the composite, the portions of the cutting edges 28 and 30 immediately adjacent the single end point 24 cut the composite material along 54 and 58, respectively. In addition, the first cutting edge 28 progressively engages the composite along, what can be considered a revolving radius 58, starting at the point 56, to cut chips therefrom which are axially directed through the flute 14.

The three wearstrips 38, 40, 42, guide the tool within that portion of the hole previously cut so that the cutting single end point 24 produces a straight hole in the composite. The transition segment 44 prevents stretching or additional cutting of the more elastic component material of the composite by the tool edge formed by the outer surface 20 and the flute side 18, and thus contributes significantly to the hole quality, particularly at the hole entrance and exit.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A tool, having an axis, for generating a hole in a composite of at least a first material and a second material having a higher modulus of elasticity than the first material when the tool, relative to the composite, is rotated about its axis in a first direction of rotation and is moved in an axial direction against the composite, the tool being in the form of a generally cylindrical rod, portions of which are removed to form an axially extending flute, and comprising:
    a planar end surface;
    a generally semi-cylindrical outer surface which determines a maximum radial dimension of the tool; and
    first and second flute side surfaces which extend radially inward from the outer surface and axially from the end surface to define the flute;
    wherein the first flute side surface intersects the end surface to form a first cutting edge and intersects the outer surface to form a second cutting edge, the end surface intersects the outer surface to form a third edge, the three edges intersecting at a common cutting single end point, with the first and second cutting edges intersecting at an acute angle at the single end point and with the third edge intersecting the first and second cutting edges at respective acute angles at the single end point.

2. A tool, as described in claim 1, wherein a portion of the tool defining the intersection of the second flute side surface and the outer surface is removed to form a transition segment of the outer surface adjacent the intersection of the second flute side surface and the outer surface, which provides a gradual transition of radial compressive stresses in the composite as the tool is rotated during a hole forming operation.

3. A tool, as described in claim 2, wherein further portions of the tool defining the outer surface are removed, to form at least two axially-extending, spaced apart, radial relief segments of the outer surface having a radial dimension less than the maximum radial dimension of the tool, wherein segments of the outer surface adjacent the radial relief segments constitute at least three axially-extending wear band segments of the outer surface having a radial dimension which is the maximum radial dimension of the tool, a first one of the wearstrip segments intersecting the first flute side surface and a final one of the wearstrip segments being disposed adjacent the transition segment of the outer surface;
    whereby, during a deep hole forming operation, the wearstrip segments of the outer surface serve to guide the tool within the hole being formed.

4. A tool, as described in claim 1, wherein the end surface defines an ellipse with the angle subtended along the third edge from the single end point to the major axis of the ellipse being an obtuse angle in the range of 150° to 165°.

5. A tool, as described in claim 1, wherein the intersection of the outer surface and the first flute side surface is angularly spaced from the intersection of the outer surface and the second flute side surface by an obtuse angle in the range of 110° to 130°.

6. A tool, as described in claim 1, wherein at least portions of the tool forming the first and second cutting edges comprise a metal carbide material.

7. A tool, as described in claim 6, wherein the metal carbide material is tungsten carbide.

8. A tool, as described in claim 6, wherein the metal carbide material is titanium carbide.

9. A tool, as described in claim 1, wherein said first and second flute side surfaces extending radially inward from the generally semi-cylindrical outer surface have curved inner portions which define an axially-extending semi-cylindrical inner surface concentric to the semi-cylindrical outer surface, whereby the flute is in the form of an axial bore which is opened along one side.

10. A tool, as described in claim 1, wherein the first flute side surface intersects the outer surface adjacent the single end point at an acute angle.

11. A tool, as described in claim 1, wherein the first and second cutting edges intersect at the single end point at an acute angle not exceeding 65°.

12. A tool, as described in claim 1, wherein the acute angle formed by the intersection of the first and second cutting edges has a range between 20° and 65°.

13. A tool, as described in claim 1, wherein the acute angle formed by the third edge and the first cutting edge has a range between 65° and 90°.

14. A tool, as described in claim 1, wherein the acute angle formed by the third edge and the second cutting edge has a range between 15° and 25°.

15. A method of generating a hole in a composite of at least a first material and a second material having a higher modulus of elasticity than the first material, the hole being generated having a circumferential surface limit and a longitudinal axis, the method comprising the steps of:
    cutting and continuously penetrating the composite at the circumferential surface limit of the hole and at a point which travels about the circumferential surface and in the direction of the longitudinal axis of the hole being generated; and
    simultaneously cutting the composite continuously about the circumferential surface and along a revolving radius of the hole being generated, wherein the revolving radius is inclined relative to the longitudinal axis of the hole.

16. A tool, as described in claim 1, wherein, at the end surface, the first and second flute side surfaces interest at the tool axis.

17. A tool, as described in claim 1, wherein the first and second cutting edges intersect at the single end point at an acute angle not greater than 65°, and the acute angle formed by the second cutting edge and the third edge is not greater than 25°.

* * * * *